US012423620B2

(12) United States Patent
Riva et al.

(10) Patent No.: US 12,423,620 B2
(45) Date of Patent: Sep. 23, 2025

(54) INTENT-BASED TASK REPRESENTATION LEARNING USING WEAK SUPERVISION

(71) Applicant: Microsoft Technology Licensing, LLC, Redmond, WA (US)

(72) Inventors: Oriana Riva, Redmond, WA (US); Michael Gamon, Seattle, WA (US); Sujay Kumar Jauhar, Kirkland, WA (US); Mei Yang, Redmond, WA (US); Sri Raghu Malireddi, Vancouver (CA); Timothy C. Franklin, Seattle, WA (US); Naoki Otani, Pittsburgh, PA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 847 days.

(21) Appl. No.: 17/710,880

(22) Filed: Mar. 31, 2022

(65) Prior Publication Data

US 2023/0244989 A1 Aug. 3, 2023

Related U.S. Application Data

(60) Provisional application No. 63/305,191, filed on Jan. 31, 2022.

(51) Int. Cl.
*G06N 3/04* (2023.01)
*G06F 40/30* (2020.01)
*G06N 20/00* (2019.01)

(52) U.S. Cl.
CPC ............. *G06N 20/00* (2019.01); *G06F 40/30* (2020.01)

(58) Field of Classification Search
CPC .... G06N 20/00; G06N 3/0455; G06N 3/0895; G06F 40/30
See application file for complete search history.

(56) References Cited

U.S. PATENT DOCUMENTS 8,694,355 B2   4/2014   Bui et al.
10,706,373 B2  7/2020   Gruber et al.
(Continued)

FOREIGN PATENT DOCUMENTS

CA    3123387 A1    11/2021
CN   113282368 A *   8/2021   ......... G06F 9/45558
(Continued)

OTHER PUBLICATIONS

Aghajanyan, et al., "Muppet: Massive Multi-task Representations with Pre-Finetuning", In Repository of arXiv:2101.11038v1, Jan. 26, 2021, 12 Pages.
(Continued)

*Primary Examiner* — Hassan Mrabi
(74) *Attorney, Agent, or Firm* — Ray Quinney & Nebeker P.C.; James S. Bullough

(57) ABSTRACT

Systems and methods are described that are generally directed to generating a general task embedding representing task information. In examples, the generated task embedding may include predicted task information such that, rather being underspecified, the task embedding representative of the task may include additional specified information, where the task embedding can then be utilized in many different models and applications. Thus, task data may be received and at least a portion of the task data may be encoded using an encoder. Based on one or more outputs generated by the encoder and a type embedding associated with the task data, a task intent may be extracted or otherwise predicted based on the task data and one or more type encodings associated with the task data. The intent extractor may be trained on multiple auxiliary tasks with weak supervision that provide semantic augmentation to under-specified task texts.

20 Claims, 7 Drawing Sheets

(56) References Cited

U.S. PATENT DOCUMENTS

2020/0125944 A1    4/2020    Jauhar et al.
2021/0142164 A1    5/2021    Liu et al.

FOREIGN PATENT DOCUMENTS

WO    WO-2022023385 A1 *    2/2022    ............ G06N 3/006
WO    WO-2022088444 A1 *    5/2022    ............ G06F 16/35

OTHER PUBLICATIONS

Barr, et al., "The Linguistic Structure of English Web-Search Queries", In Proceedings of the Conference on Empirical Methods in Natural Language Processing, Oct. 25, 2008, pp. 1021-1030.

Bosselut, et al., "COMET: Commonsense Transformers for Automatic Knowledge Graph Construction", In Proceedings of the 57th Annual Meeting of the Association for Computational Linguistics, Jul. 28, 2019, pp. 4762-4779.

Broder, Andrei, "A Taxonomy of Web Search", In Proceedings of ACM SIGIR Forum, vol. 36, Issue 2, Sep. 1, 2002, pp. 3-10.

Camacho-Collados, et al., "From Word To Sense Embeddings: A Survey on Vector Representations of Meaning", In Journal of Artificial Intelligence Research, vol. 63, Dec. 6, 2018, pp. 743-788.

Chaudhari, et al., "An Attentive Survey of Attention Models", In Journal of ACM Transactions on Intelligent Systems and Technology, vol. 12, Issue 5, Oct. 22, 2021, 32 Pages.

Cho, et al., "Learning Phrase Representations using RNN Encoder-Decoder for Statistical Machine Translation", In Proceedings of the Conference on Empirical Methods in Natural Language Processing, Oct. 25, 2014, pp. 1724-1734.

Devlin, et al., "BERT: Pre-training of Deep Bidirectional Transformers for Language Understanding", In Proceedings of the Conference of the North American Chapter of the Association for Computational Linguistics: Human Language Technologies, vol. 1, Jun. 2, 2019, pp. 4171-4186.

Dror, et al., "Replicability Analysis for Natural Language Processing: Testing Significance with Multiple Datasets", In Journal of Transactions of the Association for Computational Linguistics, Dec. 1, 2017, pp. 471-486.

Du, et al., "General Purpose Text Embeddings from Pre-Trained Language Models for Scalable Inference", In Repository of arXiv:2004.14287v1, Apr. 29, 2020, 12 Pages.

Gil, et al., "Capturing Common Knowledge about Tasks: Intelligent Assistance for To-Do Lists", In Journal of ACM Transactions on Interactive Intelligent Systems, vol. 2, Issue 3, Sep. 1, 2012, 35 Pages.

Gorman, et al., "We need to talk about standard splits", In Proceedings of the 57th Annual Meeting of the Association for Computational Linguistics, Jul. 28, 2019, pp. 2786-2791.

Graus, et al., "Analyzing and Predicting Task Reminders", In Proceedings of the Conference on User Modeling Adaptation and Personalization, Jul. 13, 2016, pp. 7-15.

Honnibal, et al., "spaCy: Industrial strength natural language processing in Python", Retrieved from: https://github.com/explosion/spaCy/tree/v3.2.0, Nov. 5, 2021, 7 Pages.

Hwang, et al., "Comet-Atomic 2020: On Symbolic and Neural Commonsense Knowledge Graphs", In Proceedings of the Thirty-Fifth AAAI Conference on Artificial Intelligence, Feb. 2, 2021, pp. 6384-6392.

Jauhar, et al., "Ms-latte: A dataset of where and when to-do tasks are completed", In Repository of arXiv:2111.06902v1, Nov. 12, 2021, 10 Pages.

Keyaki, et al., "Part-of-speech Tagging for Web Search Queries Using a Large-scale Web Corpus", In Proceedings of the Symposium on Applied Computing, Apr. 3, 2017, pp. 931-937.

Kobayashi, et al., "Attention is Not Only a Weight: Analyzing Transformers with Vector Norms", In Proceedings of the Conference on Empirical Methods in Natural Language Processing, Nov. 16, 2020, pp. 7057-7075.

Landes, et al., "A Supervised Approach To The Interpretation Of Imperative To-Do Lists", In Repository of arXiv:1806.07999v1, Jun. 20, 2018, 10 Pages.

Landes, Paul, "Supervised Approach Imperative To-Do List Categorization", Retrieved from: https://github.com/plandes/todo-task, Jun. 29, 2018, 9 Pages.

Lewis, et al., "BART: Denoising Sequence-to-Sequence Pretraining for Natural Language Generation, Translation, and Comprehension", In Proceedings of the 58th Annual Meeting of the Association for Computational Linguistics, Jul. 5, 2020, pp. 7871-7880.

Liu, et al., "Multi-Task Deep Neural Networks for Natural Language Understanding", In Proceedings of the 57th Annual Meeting of the Association for Computational Linguistics, Jul. 28, 2019, pp. 4487-4496.

Liu, et al., "Roberta: A Robustly Optimized BERT Pretraining Approach", In Repository of arXiv:1907.11692v1, Jul. 26, 2019, 13 Pages.

Loshchilov, et al., "Decoupled Weight Decay Regularization", In Journal of The Seventh International Conference on Learning Representations, May 6, 2019, 18 Pages.

Luong, et al., "Effective Approaches to Attention-based Neural Machine Translation", In Proceedings of the Conference on Empirical Methods in Natural Language Processing, Sep. 17, 2015, pp. 1412-1421.

Maaten, et al., "Visualizing Data Using t-SNE", In Journal of Machine Learning Research, vol. 9, Nov. 2008, pp. 2579-2605.

Mikolov, et al., "Distributed Representations of Words and Phrases and their Compositionality", In Journal of Advances in Neural Information Processing Systems, vol. 26, Dec. 5, 2013, 9 Pages.

Mou, et al., "Natural Language Inference by Tree-Based Convolution and Heuristic Matching", In Proceedings of the 54th Annual Meeting of the Association for Computational Linguistics, Aug. 7, 2016, pp. 130-136.

Mukherjee, et al., "Smart To-Do: Automatic Generation of To-Do Items from Emails", In Proceedings of the 58th Annual Meeting of the Association for Computational Linguistics, Jul. 5, 2020, pp. 8680-8689.

Nguyen, et al., "BERTweet: A pre-trained language model for English Tweets", In Proceedings of the Conference on Empirical Methods in Natural Language Processing: System Demonstrations, Nov. 16, 2020, pp. 9-14.

Panchenko, et al., "Building a Web-Scale Dependency-Parsed Corpus from CommonCrawl", In Proceedings of the Eleventh International Conference on Language Resources and Evaluation, May 7, 2018, pp. 1816-1823.

Pappas, et al., "GILE: A Generalized Input-Label Embedding for Text Classification", In Transactions of the Association for Computational Linguistics, vol. 7, Apr. 2019, pp. 139-155.

Paszke, et al., "PyTorch: An Imperative Style, High-Performance Deep Learning Library", In Proceedings of the 33rd Conference on Neural Information Processing Systems, Dec. 8, 2019, 12 Pages.

Patel, et al., "Magnitude: A Fast, Efficient Universal Vector Embedding Utility Package", In Proceedings of the Conference on Empirical Methods in Natural Language Processing: System Demonstrations, Oct. 31, 2018, pp. 120-126.

Pedregosa, et al., "Scikit-learn: Machine Learning in Python", In Journal of Machine Learning Research, vol. 12, Nov. 1, 2011, pp. 2825-2830.

Pentyala, et al., "Multi-Task Networks with Universe, Group, and Task Feature Learning", In Proceedings of the 57th Annual Meeting of the Association for Computational Linguistics, Jul. 28, 2019, pp. 820-830.

Pereyra, et al., "Regularizing neural networks by penalizing Confident output distributions", In Journal of the Fifth International Conference on Learning Representations, Apr. 24, 2017, pp. 1-11.

Qiu, et al., "Pre-trained models for natural language processing: A survey", In Journal of Science China Technological Sciences, vol. 63, Issue 10, Sep. 15, 2020, 25 Pages.

Nouri, et al., "Step-wise Recommendation for Complex Task Support", In Proceedings of the Conference on Human Information Interaction and Retrieval, Mar. 14, 2020, pp. 203-212.

(56) References Cited

OTHER PUBLICATIONS

Radford, et al., "Language Models are Unsupervised Multitask Learners", In Journal of OpenAI Blog, vol. 1, Issue 8, Feb. 24, 2019, 24 Pages.

Raffel, et al., "Exploring the Limits of Transfer Learning with a Unified Text-to-Text Transformer", In Journal of Machine Learning Research, vol. 21, Issue 140, Jun. 2020, pp. 1-67.

Ruder, Sebastian, "An Overview of Multi-Task Learning in Deep Neural Networks", Retrieved from: https://ruder.io.multi-task/, May 29, 2017, 32 Pages.

Ruppenhofer, et al., "FrameNet II: Extended theory and practice", Retrieved from: https://framenet2.icsi.berkeley.edu/docs/r1.7/book.pdf, Nov. 1, 2016, 129 Pages.

Shah, et al., "Bridging Task Expressions and Search Queries", In Proceedings of the Conference on Human Information Interaction and Retrieval, Mar. 14, 2021, pp. 319-323.

Shui, et al., "A Principled Approach for Learning Task Similarity in Multitask Learning", In Proceedings of the Twenty-Eighth International Joint Conference on Artificial Intelligence, Mar. 21, 2019, pp. 3446-3452.

Shuster, et al., "The Dialogue Dodecathlon: Open-Domain Knowledge and Image Grounded Conversational Agents", In Proceedings of the 58th Annual Meeting of the Association for Computational Linguistics, Jul. 5, 2020, pp. 2453-2470.

Speer, et al., "ConceptNet 5.5: An Open Multilingual Graph of General Knowledge", In Proceedings of the AAAI Conference on Artificial Intelligence, Feb. 12, 2017, pp. 4444-4451.

Stickland, et al., "BERT and PALs: Projected Attention Layers for Efficient Adaptation in Multi-Task Learning", In Proceedings of the 36th International Conference on Machine Learning, Jun. 9, 2019, 12 Pages.

Swayamdipta, et al., "Frame-Semantic Parsing with Softmax-Margin Segmental RNNs and a Syntactic Scaffold", In Repository of arXiv:1706.09528v1, Jun. 29, 2017, 12 Pages.

Taghavi, et al., "An analysis of web proxy logs with query distribution pattern approach for search engines", In Journal of Computer Standards & Interfaces, vol. 34, Issue 1, Jan. 2012, pp. 162-170.

Zhang, et al., "Multi-Task Learning for Sentiment Analysis with Hard-Sharing and Task Recognition Mechanisms", In Journal of Information, vol. 12, No. 5, May 12, 2021, 13 Pages.

Vaswani, et al., "Attention Is All You Need", In Proceedings of 31st Conference on Neural Information Processing Systems, Dec. 4, 2017, pp. 1-11.

Wolf, et al., "Transformers: State-of-the-Art Natural Language Processing", In Proceedings of the Conference on Empirical Methods in Natural Language Processing: System Demonstrations, Nov. 16, 2020, pp. 38-45.

Zhang, et al., "Learning to Decompose and Organize Complex Tasks", In Proceedings of the Conference of the North American Chapter of the Association for Computational Linguistics: Human Language Technologies, Jun. 6, 2021, pp. 2726-2735.

"International Search Report and Written Opinion Issued in PCT Application No. PCT/US22/049337", Mailed Date: Mar. 27, 2023, 14 Pages.

\* cited by examiner

INTENT-BASED TASK REPRESENTATION LEARNING USING WEAK SUPERVISION

CROSS-REFERENCE TO RELATED APPLICATIONS

This application claims priority to U.S. Provisional Application Ser. No. 63/305,191, filed Jan. 31, 2022, the entire disclosure of which is hereby incorporated herein by reference.

BACKGROUND

Users write to-dos as personal notes to themselves, about things they need to complete, remember, or organize. To-do texts are usually short and under-specified, which poses a challenge for text representation models. Task management systems, such as systems that may manage tasks or things people do, in work and in their personal life, may allow a user to enter, create, or assign a task for themselves, such as buying groceries, planning a party, enrolling kids in school, or completing an item at work. While task management systems may provide additional structure or intelligence behind a task, tasks may be short and under-specified, which again poses a challenge for text representation models. Yet, understanding and representing the meaning of tasks is an important step towards providing intelligent assistance for managing such tasks.

Applications exist that help us keep track of tasks that are upcoming or tasks that have been completed. Systems exist to help prioritize task, help complete tasks, and even provide recommendations by suggesting information about a task. In some instances, systems exist that can automate a task and may even perform a task on a user's request, thereby allowing a user to confirm a suggested action, where the suggested action is what the user wanted to do. A task, while being something very understandable to humans, is not very well understood by task management systems and machines in general. That is, task management systems lack the ability to reason about a task; thus, many different systems may be built that are very specific toward implementing a particular type of a task or a task that meets a specific criterion. To implement some features associated with a task or provide some reasoning or meaning about a task, most systems are therefore application specific. Indeed, data may be collected if there is a machine learning model involved, but to build experiences based on such learning a task definition is assumed based on such application, learning, or experience. Accordingly, there is a need to represent a task in a general manner such that the representation of the task can be utilized in many different models and applications.

SUMMARY

In accordance with examples of the present disclosure, systems and methods are described that are generally directed to generating a general task embedding representing task information. In examples, the generated task embedding may include predicted task information such that, rather being underspecified, the task embedding representative of the task may include additional specified information, where the task embedding can then be utilized in many different models and applications.

In accordance with examples of the present disclosure, a method for generating a task embedding is described. The method may include receiving task data and then encoding at least a portion of the task data using an encoder. Based on one or more outputs generated by the encoder and a type embedding associated with the task data, a task intent may be extracted or otherwise predicted based on the task data and one or more type encodings associated with the task data. The intent extractor may be trained on multiple auxiliary tasks with weak supervision that provide semantic augmentation to under-specified task texts. Based on an underlying assumption that tasks with similar intents have similar target labels/texts in the auxiliary tasks, a multi-task learning framework may be utilized during the training of the intent-based task representation model.

In accordance with examples of the present disclosure, a system for generating a task embedding is described. The system may include one or more hardware processors configured by machine-readable instructions to: receive task data and then encode at least a portion of the task data using an encoder. Based on one or more outputs generated by the encoder and a type embedding associated with the task data, a task intent may be extracted or otherwise predicted based on the task data and one or more type encodings associated with the task data. The intent extractor may be trained on multiple auxiliary tasks with weak supervision that provide semantic augmentation to under-specified task texts. In examples, a multi-task learning framework may be utilized during the training of the intent-based task representation model.

Any of the one or more above aspects in combination with any other of the one or more aspects. Any of the one or more aspects as described herein.

This Summary is provided to introduce a selection of concepts in a simplified form, which is further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the following description and, in part, will be apparent from the description, or may be learned by practice of the disclosure.

BRIEF DESCRIPTION OF THE DRAWINGS

Non-limiting and non-exhaustive examples are described with reference to the following Figures.

DETAILED DESCRIPTION

Figure 1:
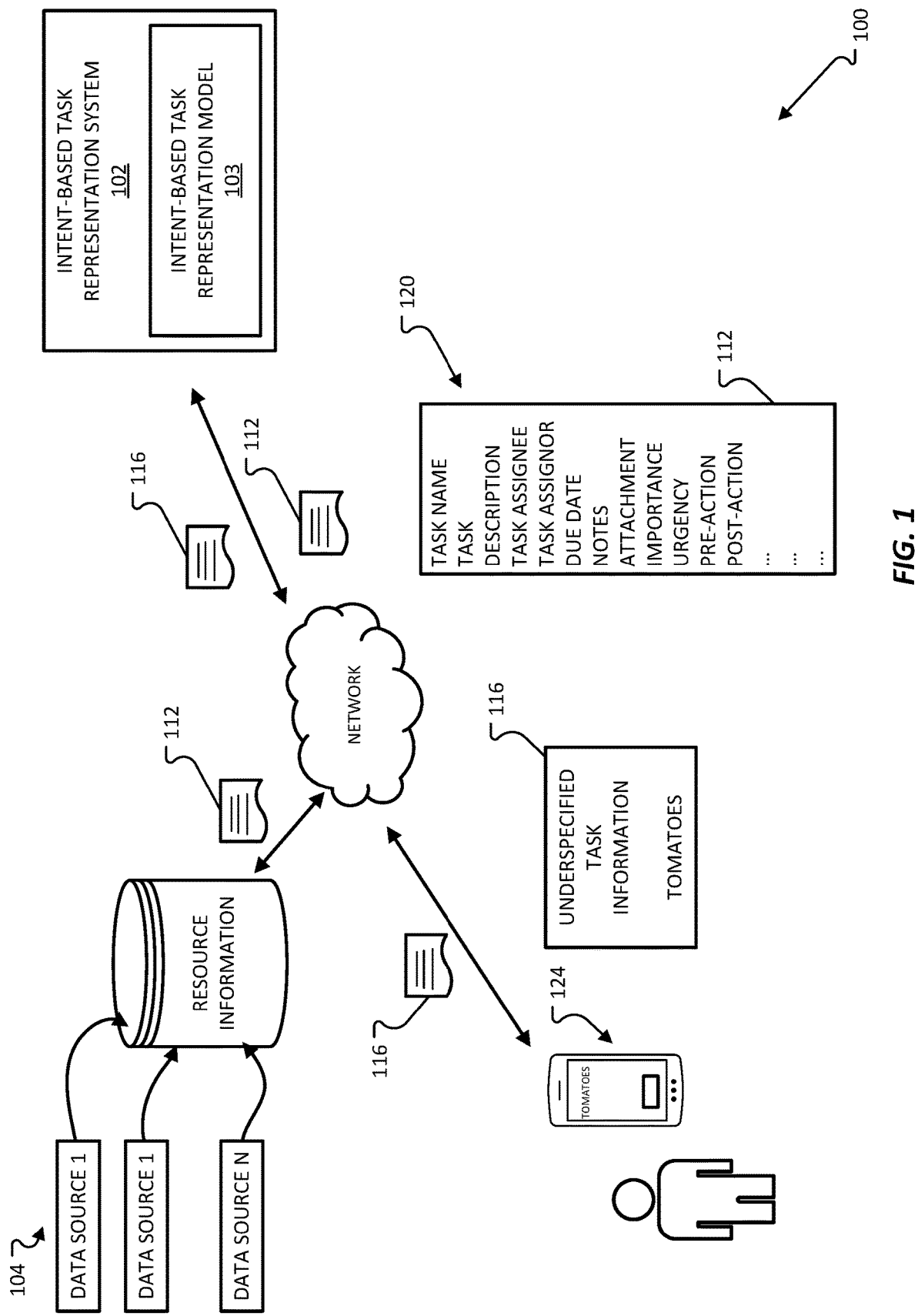
FIG. 1 depicts an example of a system for generating a task embedding or vector from a task obtained by such system in accordance with examples of the present disclosure.

In the following detailed description, references are made to the accompanying drawings that form a part hereof and in which are shown by way of illustrations specific embodiments or examples. These aspects may be combined, other aspects may be utilized, and structural changes may be made without departing from the present disclosure. Examples may be practiced as methods, systems, or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

Examples of the present disclosure are generally directed to generating a task embedding for a task such that different downstream applications may utilize the task embedding. Thus, as provided in the following non-limiting examples, an area of understanding provided by the task embedding may allow a downstream application to: (1) understand whether two tasks that have been provided (e.g., writing a document or an email) are happening or should be happening in the same space or at the same time; (2) understand prioritization; and/or (3) understand the properties of this task. For example, is the task about or directed to work, school, family; does the task belong to a specific class. Accordingly, a task embedding representing a task may be a general representation of the task, such that systems can have the ability to determine, generate, or learn reason and/or reasoning for such tasks and related concepts.

In examples, a general representation of the task, or task embedding may be obtained using limited data. That is, there is no one data set that can provide a definition of a task and all the properties related to the task. For instance, existing AI applications may be able to understand that a user has a task to accomplish because it has been written down or it is regularly scheduled to occur; however, such AI system would not be able to understand how a user, or human, actually carries out the task or the relevant attributes or properties that are involved in accomplishing the task. For example, if a task was directed to planning a party, a system would most likely provide suggestions about planning a party and may even recommend a location or theme; however, such system would not have access to, identify, or know the relevant attributes and properties involved for a human to plan a party. That is, to organize a party, a user would know that there is a list of people I need to invite, a location and time to determine, the need to prepare or obtain a birthday cake.

As another example, when a user writes tasks or to-dos down such as a list of items, there are a number of challenges that a system may encounter when using such information. For example, if user maintains a grocery list using an application on a mobile device, most likely, the user does not write down every property and attribute of the item that they wish to purchase. That is, if a user is putting "tomatoes" on a grocery list, they do not write down, that they need 400 grams of tomatoes, of a particular variety, from a specific aisle in a supermarket on Saturday. Instead, the user would generally just write or cause "tomatoes" to appear on the list.

Similarly, context becomes important to add meaning and understanding for such data. For example, if a list has a name, for example "groceries" and the list includes milk and plastic bags; a generic language model that ignores the list name may correctly indicate that plastic bags and milk are very different things. For example, one is a liquid and is a consumable, whereas the other is a container and made from plastic. In the context of a list named "groceries", however, both milk and plastic bags can be identified as to-do items that are similar because they are both to be bought at a grocery store. When a user adds an item to a list, the user is aware of the context and generally does not add that to the list or otherwise include the additional context in the task. Because the amount of context provided by the user tends to be minimal or otherwise under-specified, any additional context that can be gleaned or otherwise obtained can improve the task representation.

In accordance with examples of the present disclosure, context such as task parameters and task attributes, may be represented in an embedding provided by a trained machine learning model. Accordingly, based on task data provided from a user, a task embedding, or vector, may be generated for use in a downstream application, such as a calendaring application, scheduling application, list application, etc. In examples, the task embedding may represent the data provided by a user together with additional augmented data predicted from the trained machine learning model such that task parameters and/or attributes are obtained or otherwise associated with the task.

Various sources may be used as task related training data. Such source data is generally very expensive or impossible to collect. For example, it is often difficult to obtain data that is based on asking users to keep detailed diaries of everything they do. However, incomplete data may exist which can be leveraged through weak supervision because the data obtained may be from sources of data that can be automatically featurized from raw data, without the need for a human, such as a crowd worker or domain expert, to annotate the data. Training data about tasks or to-dos may be obtained from existing textual data, knowledge bases or other models that generate auxiliary data sets such that a machine learning model trained to generate a task embedding can be trained on enriched data from weakly supervised data sources. That is, available resources can be obtained, and in some instances combined, to generate auxiliary data sets having greater amounts of context for a task or to-do. A task embedding system can then learn from such enriched data, and may be trained to optimize multiple auxiliary prediction tasks, such as but not limited to the prediction of prerequisites for an action, goals for an action, autocompletion of an action, etc. Accordingly, such task embeddings may be close together if they are for similar tasks provided by a user; thus, such task embeddings may be similar tasks and may exist relatively close to one another in a vector space. For example, a task embedding for buying milk and a task embedding for buying plastic bags may be close to each other (e.g., a distance between the two task embeddings may be relatively small) when in a vector space that includes groceries.

The various available data sources may exist as knowledge bases with task or to-do related data, calendar applications with meeting and event related data, or even conversational applications where users discuss plans and tasks with others. Alternatively, or in addition, web data, such as data from a web search engine, may be used to surface concepts that may be related to a task. For example, a user may begin a task of planning a birthday party by searching for birthday party planning or organization items using a search engine; in some examples, the search engine may provide additional data, or augmented data, about the planning task. While the search engine may not understand the specific context related to the task, such as the context associated with the birthday party (e.g., scheduling, food and beverage and other dietary considerations, age of participants, health related considerations, etc.), auxiliary data made available by the search engine (e.g., autocomplete, search results, etc.) may be used to augment the original task description. While such additional data may be large and may be used to provide weak supervision, noisy data may be inferior to a manually annotated data. However, the additional or augmented data can be used to train a machine learned model to, for example, generate more complete and specified descriptions for tasks, such as short tasks.

As another example, existing knowledge bases that have previously studied task data may include frames, task examples, or otherwise a basic task description template for a task. A frame may include data specific to the task and may provide an indication of what a task looks like, what happens before a task, and what happens after a task. For example, a grocery related task directed to purchasing or otherwise acquiring an item may include additional data, such as frame data, that provides an indication about what happens before the task (e.g., drive to the grocery store) or what happens after the task (e.g., load groceries into a car or refrigerator). Such data in relevant frames may be used for training a task embedding model. More specifically, the data from frames that are relevant to a task may be used to optimize the prediction of actions that occur before and after a task such that a task data may be more fully described.

As previously described, multitask learning may bring together various separate auxiliary tasks, where each separate auxiliary task provides some valuable data about a task but may not necessarily provide the complete picture of the task. Thus, an auxiliary task group, or action group, may group auxiliary task data to provide more of a complete picture about the task (e.g., parameters, attributes, related tasks, etc.). That is, the more data about a task that is acquired and then brought together, from various data sources for example, the better a final representation (e.g., task embedding) can be generated that may incorporate such additional data about the task that is known or inferred together and represented in a single task embedding representation or vector. For example, the final representation may be more accurate or otherwise more accurately represent a task when a larger quantity of data is obtained and/or when such data is obtained from various data sources. Accordingly, a machine learning model may be trained to understand the concept of a task, based on the data, and then represent this understanding, or concept, as a vector or task embedding.

FIG. 1 depicts details of a system 100 implementing an intent-based task representation system 102 in accordance with examples of the present disclosure. The intent-based task representation system 102 utilizes a trained intent-based task representation model 103 to generate a task embedding, or vector, based on task information provided as input. In examples, the intent-based task representation model 103 may include an encoder and an intent extractor. The encoder may encode input data by converting a sequence of input tokens into real-valued vector representations using multiple layers of attention mechanism and fully connected networks. Last hidden states obtained from the encoder are then used as contextual token representations of the input and are combined with token type embeddings to inform the trained intent-based task representation model 103 of the source of each token.

As one non-limiting example, the trained intent-based task representation model 103 may take as input, descriptions of tasks and list names, where the list names may be used as an identifier of a task group (e.g., shopping list, party planning tasks, etc.). List names are often, but not always, indicative of task intents. For example, a "shopping" list tends to have items that a user wishes to purchase and can be used to identify the intent (e.g., purchase item). However, some list names merely express time (e.g., "today", "tomorrow", "past", "future", etc.), topics/targets (e.g., "family", "location", "vehicle", etc.), or may express non-specific information (e.g., "things to do", etc.). In such cases, the trained intent-based task representation model 103 should "pay more attention" to the description. That is, the trained intent-based task representation model 103 may be trained such that a list name may be more impactful when more likely to identify an intent. As one example, a multi-head attention mechanism may be used to extract a vector representation of the intent of a task. One or more token type embeddings may also be introduced to explicitly inform the trained intent-based task representation model 103 of text types. Of course, input, including data other than list names and descriptions, may be used and is contemplated herein.

The trained intent-based task representation model 103 may be trained using multiple datasets 104 using weak supervision, as previously described. Accordingly, a plurality of datasets 104, representing task data, may be provided to an intent-based task representation model and the intent-based task representation model may implement multi-task learning during a training process to optimize model parameters across multiple auxiliary prediction tasks. At run-time, a computing device 124 may provide a task 116 as an input to the trained intent-based task representation model 103. The trained intent-based task representation model 103 can then predict a task embedding or vector 112, representing the task 116. That is, various attributes and parameters 120 relating to a task may be predicted for an initial task 116 provided as input to the trained intent-based task representation model 103. The resulting task embedding or vector 112 can then be used in a downstream application (e.g., calendaring, list making, planning, organizing etc.).

Figure 2A:
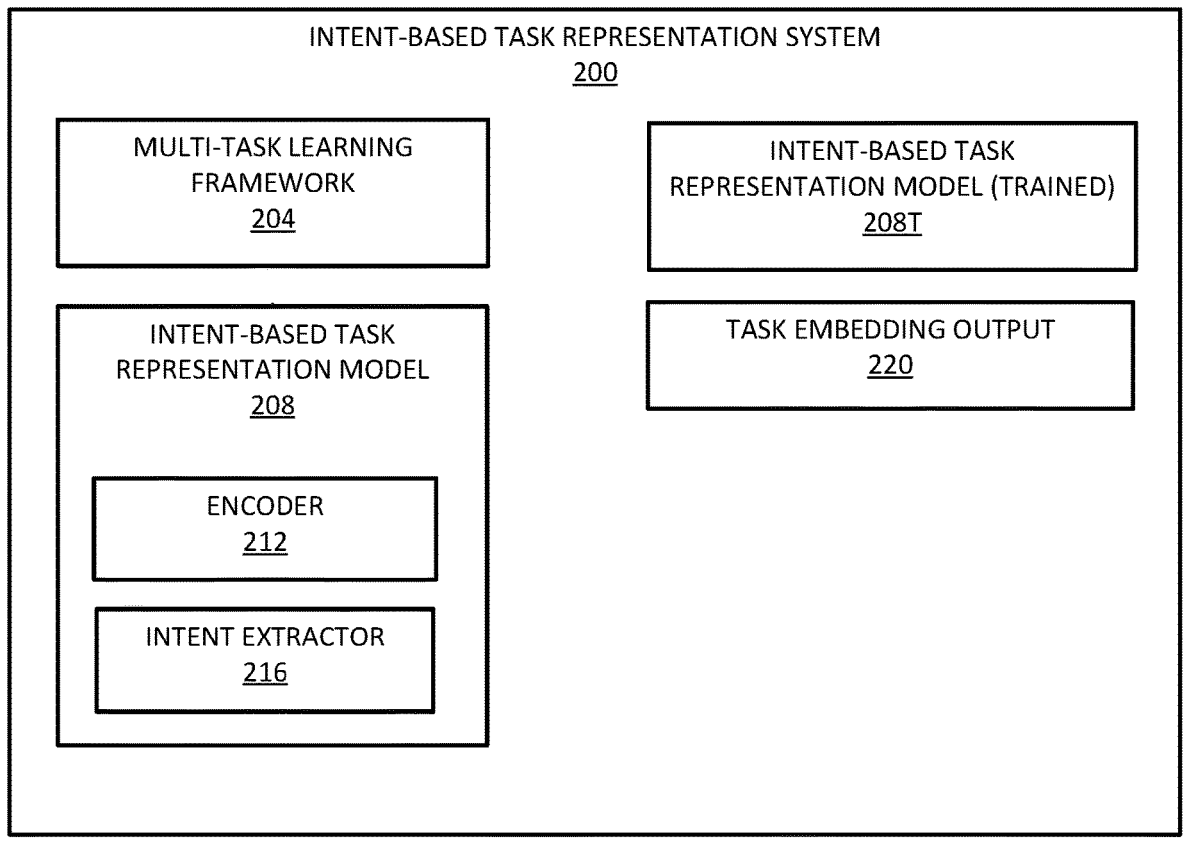
FIGS. 2A-2B depict additional details of the task embedding prediction server task in accordance with examples of the present disclosure.
Figure 2B:
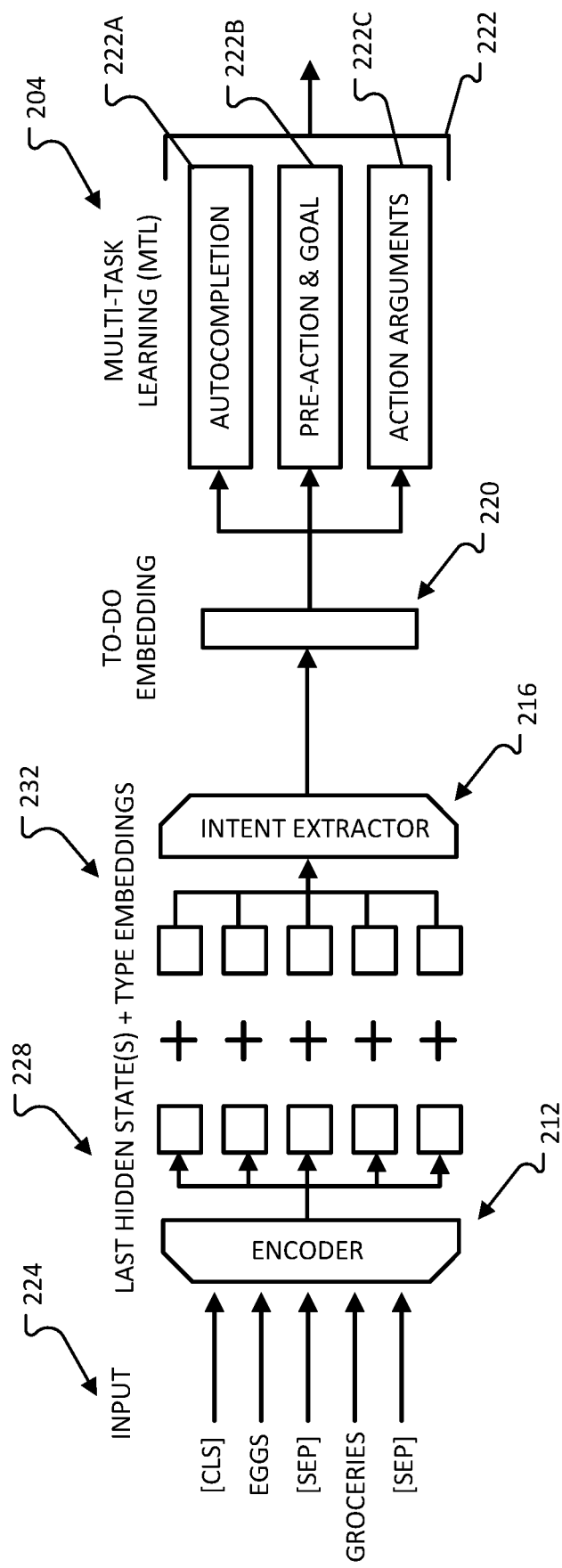

FIGS. 2A-2B depict additional details of an intent-based task representation system 200 in accordance with examples of the present disclosure. The intent-based task representation system 200 may include a multi-task learning framework 204 and an intent-based task representation model 208. The intent-based task representation model 208 may include an encoder 212 and an extractor 216. In examples, once trained, the trained intent-based task representation model (referred to as 208T in FIG. 2A) may generate a task embedding output 220 based on an input.

The intent-based task representation model 208/208T may include an intent extractor 216 that is trained by directly optimizing the intent extractor 216 to predict an intent of a given task. However, task intents are often obscure and may be difficult to discretize into a fixed number of categories. As a result, manual collection of such categories can be costly and subjective. For example, "buy milk" and "buy a car" are both purchase actions, but they differ in many aspects, for example, different locations, different prerequisite events, and/or different motives. Therefore, the intent extractor 216 may be trained on multiple auxiliary tasks with weak supervision that provide semantic augmentation to underspecified task texts. Based on an underlying assumption that tasks with similar intents have similar target labels/texts in the auxiliary tasks, a multi-task learning framework 204 may be utilized to train the intent-based task representation model 208 using a plurality of auxiliary tasks. That is, multi-task learning is used to optimize the model parameters to perform well on the multiple auxiliary prediction tasks, based on the auxiliary data sets. In non-limiting examples, the auxiliary prediction tasks may include an autocompletion task 222A, a pre-action and goal generation task 222B, and/or an action arguments prediction task 222C. Additional details of three auxiliary training tasks (e.g., Autocompletion, Pre-action and Goal Generation, and Action Argument Prediction) are described below. Of course, there may be more or less than three auxiliary training tasks, and auxiliary training tasks that are different from what is described below may be used.

The encoder 212 of the intent-based task representation model 208 may be a pretrained transformer-based encoder, such as a pretrained text encoder. Alternatively, or in addition, the encoder 212 may be a custom trained encoder specific to the data being used and/or may encode other types of data (e.g., date/time, location, a person a task is assigned to, importance level, etc.). As depicted in FIG. 2B, and as a non-limiting example, input data 224 that is provided to the intent-based task representation model 208 may include an initial task description. In examples, the input data 224 may include special START and END tokens indicating where an input starts and where an input ends, and further distinguishing between data, such as a task description and a task collection name (e.g., name of a list). As an example, input data 224 may start with a START token describing a task, and then include a token separating the task description from the task collection name. The input data 224 may proceed to the encoder 212 where various hidden states 228 may be generated. That is, the encoder 212 takes the input data 224 and encodes the input data 224 into an output. There are a variety of different ways to obtain the output from the encoder 212, (e.g., compute an average, and compute a second last state, a last hidden state). However, in one example, the last hidden states 228 are selected as the output and are then concatenated with a type embedding 232, where the type embedding 232 may identify a token type, such as a list, to-do, task, other, etc. The last hidden states 228 and the type embeddings 232 are fed to the intent extractor 216.

In accordance with examples of the present disclosure, the input data 224 is not limited to data provided by a user or system. For example, in addition to a task or to-do description and each item on the list, additional contextual data may be provided to an encoder, concatenated with a type embedding 232, and then provided to the intent extractor 216. For example, location data (e.g., a location of a user when they create the list) may be included as additional input and concatenated with another type embedding. Other types of data and/or type embeddings may be associated with the following non-limiting examples: (1) a time at which the user created the list; (2) an identity associated with a user that wrote the list; (3) whether the user that wrote the list is in a certain organizational chart; (4) whether the list was written in an application or calendar; and (5) whether the list was received from an email or a phone call.

The intent-based task representation model 208 may be trained utilizing multi-task learning over one or more auxiliary prediction tasks 222. As discussed above, multi-task learning is used to optimize the model parameters to perform well on the multiple auxiliary prediction tasks, based on the auxiliary data sets. In a non-limiting example, the auxiliary prediction tasks may be an autocompletion task 222A, a pre-action and goal generation task 222B, and an action arguments prediction task 222C. In examples, the total multi-task learning loss may be minimized during the training of the intent-based task representation model 208.

In examples, the autocompletion task 222A focuses on surface-level information of to-do texts, namely prediction of missing tokens based on context tokens. Specifically, a to-do text (the combination of a description and a list name) is provided to a model and converted into an intent embedding. A maximal form of a to-do description that is inferable from the input may then be generated. This is the auxiliary task autocompletion objective. Such forms may be automatically collected for under-specified to-do descriptions from a dataset, such as the WL dataset. Although the WL dataset is described, it should be understood that other datasets, in addition to or instead of, may be used as well.

As previously observed, to-do descriptions under generic lists (e.g., "today") tend to be more specified than those under lists whose names imply specific action. For each to-do description in the dataset, their longer descriptions (i.e., super-strings) up to five are collected. Several templates for lists that represent locations and times to further expand descriptions may also be used. For example, an input may include a description of a to-do and a list the to-do may be associated with. An output or expanded description, based on the input, may be specified for the input. As an example, an input of (milk, groceries) may be associate with an output (e.g., expanded description) of "buy milk." Similarly, an input of (buy milk, things to do) may also be associated with an output (or expanded description) of "buy milk." Such list-based templates may then be used to generate additional examples. For example, an input of (eggs, store_name) may result in a generated expanded description of "buy eggs at store_description." Thus, a resulting dataset may be generated and/or used that includes pairs of short and long to-do descriptions. The pairs of short and long to-do descriptions may be combined with specified to-do descriptions, which already have action verbs and generally do not have longer counterparts, and then sampled, where 50% of examples are under-specified. Accordingly, during training, one generation target is picked at random for each instance.

In examples, the pre-action goal generation auxiliary task 22B generally represents to-do tasks based on prerequisite actions (what must be performed beforehand) and goal events (what is the desired result) for the to-do tasks, assuming that tasks with similar intents have similar prerequisites and goals. In examples, a model is trained to generate prerequisite and goal actions for a given to-do item (a task description and a list name). This is referred to as the objective pre-action and goal generation objective. A model trained with a specific database may be used to collect weak supervision signals about to-do tasks' prerequisites and goals. Specifically, a long description of a to-do task generated in the previous step may be fed to the model as a prompt followed by a relation token: (1) xNeed (prerequisite) token to generate the task's prerequisite or (2) xIntent (goal) token to generate the task's goal. A beam search can be used to identify the top results (e.g., using a width of 3 to identify the top 3 results) that are to be collected for each relation. As an example of texts that may be generated for a pre-action and goal objective, an input of "buy milk" may generate an output including "go to store" and "get milk for breakfast." As another example, an input of "call Chris" may generate an output including "find number" and "talk to someone." In examples, COMET, a model fined tuned on the ATOMIC knowledge base, may be used to collect the weak supervision signals about to-do tasks' prerequisites and goals, though other models and other knowledge bases are contemplated herein.

In examples, different to-do tasks have different domain-specific arguments. For example, a purchase task must have a purchase target, and possibly a price argument. In contrast, contact tasks usually have a receiver and a topic of communication argument. A multi-label training task called action arguments prediction task 222C may be used, where, given a description and a list name, a model predicts the action arguments associated with the to-do task. In examples, FrameNet, a manually created database for the meaning and usage of English words/phrases, may be used. Thus, semantic representations can be defined for concepts and events (called frames) and for their semantic elements (called frame elements, FEs); example texts that trigger frames and FEs are provided below. FEs can be core FEs (essential information for a frame), or non-core (optional). As an example, an input of "buy milk" may provide "buyer, goods" action arguments as a core FE and "money" as a non-core FE. As another example, an input of "call Chris" may provide "addressee, topic" as a core FE and "medium" as a non-core FE.

Using the "long" to-do descriptions collected for the autocompletion task, frames may be identified using an off-the-shelf frame identifier. Those frames whose root frame is not "Event" can be discarded and the FEs for each frame may be collected from FrameNet. If a to-do description has two or more frames, the union of their FEs may be used. For non-core FEs, importance weights can be calculated using a numerical statistic that reflects how important the non-core FE is over the whole FrameNet repository so that common FEs appearing in many frames have low weight. In examples, term frequency-inverse document frequency (TF-IDF) may be utilized to provide such numerical statistic. Such weights may be normalized into (0, 1] by dividing each of the weights by the maximum weight. Accordingly, and as discussed above, multi-task learning is used to optimize the model parameters to perform well on the auxiliary prediction tasks, such as but not limited to the autocompletion task 222A, the pre-action and goal generation task 222B, and the action arguments prediction task 222C. In a non-limiting example, the auxiliary prediction tasks may be an autocompletion task 222A, a pre-action and goal generation task 222B, and an action arguments prediction task 222C.

In accordance with examples of the present disclosure, at run-time, the trained intent-based task representation model 208T as described above may be used to generate a task embedding output 220 (e.g., to-do embedding, vector) based on input data (e.g., 116 for example). The task embedding output 220 may then be provided to a downstream application for further use and/or processing.

Figure 3:
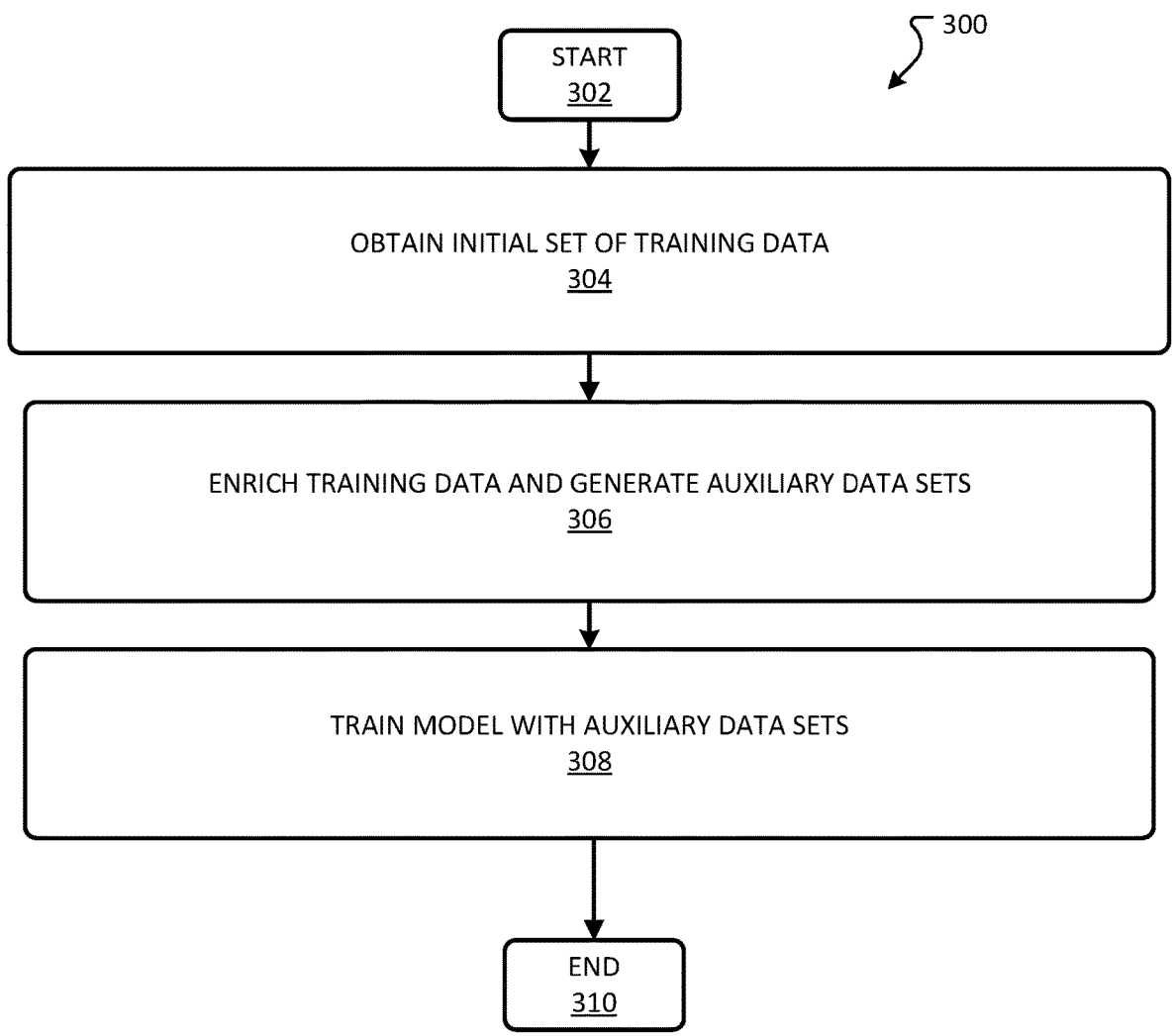
FIG. 3 depicts an example a simplified method for obtaining training data and then training an intent-based task representation model in accordance with examples of the present disclosure.

Referring now to FIG. 3, a simplified method for obtaining training data and then training an intent-based task representation model, such as the intent-based task representation model 208, is described in accordance with examples of the present disclosure. A general order for the steps of a method 300 is shown in FIG. 3. Generally, the method 300 starts at 302 and ends at 310. The method 300 may include more or fewer steps or may arrange the order of the steps differently than those shown in FIG. 3. The method 300 can be executed as a set of computer-executable instructions executed by a computer system and encoded or stored on a computer readable medium. In the illustrative aspect, the method 300 is executed by a computing device. However, it should be appreciated that aspects of the method 300 may be performed by one or more processing devices or server. Further, the method 300 can be performed by gates or circuits associated with a processor, Application Specific Integrated Circuit (ASIC), a field programmable gate array (FPGA), a system on chip (SOC), a neural processing unit, or other hardware device. Hereinafter, the method 300 shall be explained with reference to the systems, components, modules, software, data structures, user interfaces, etc. described in conjunction with FIGS. 1-2B.

The method 300 starts at 302, where flow may proceed to 304. At 304, an initial set of task related training data may be obtained. In examples, various sources may be used as task related training data. Though the task related training data may be incomplete, such data can be leveraged through weak supervision because the data obtained may be from sources of data that can be automatically featurized from raw data, without the need to be human-annotated the data or otherwise include human provided labels. Training data about tasks or to-dos may be obtained from existing textual data and/or knowledge bases for example. In some examples, the method may proceed to 306, where auxiliary training data sets may be obtained. In some examples, the auxiliary training data sets may be obtained from existing textual data, knowledge bases, or other models configured to generate tasks or to-do training data sets. Thus, at 308, and during a training process, the intent-based task representation model can be trained on enriched data from weakly supervised data sources. That is, available resources can be obtained, and in some instances combined, to generate auxiliary data sets at 306 having greater amounts of context for a task or to-do. A task embedding system can then be trained from such enriched data. The method 300 may then end at 310. Additional details of a training process (e.g., 308) for the intent-based task representation model are provided with respect to FIG. 4.

Figure 4:
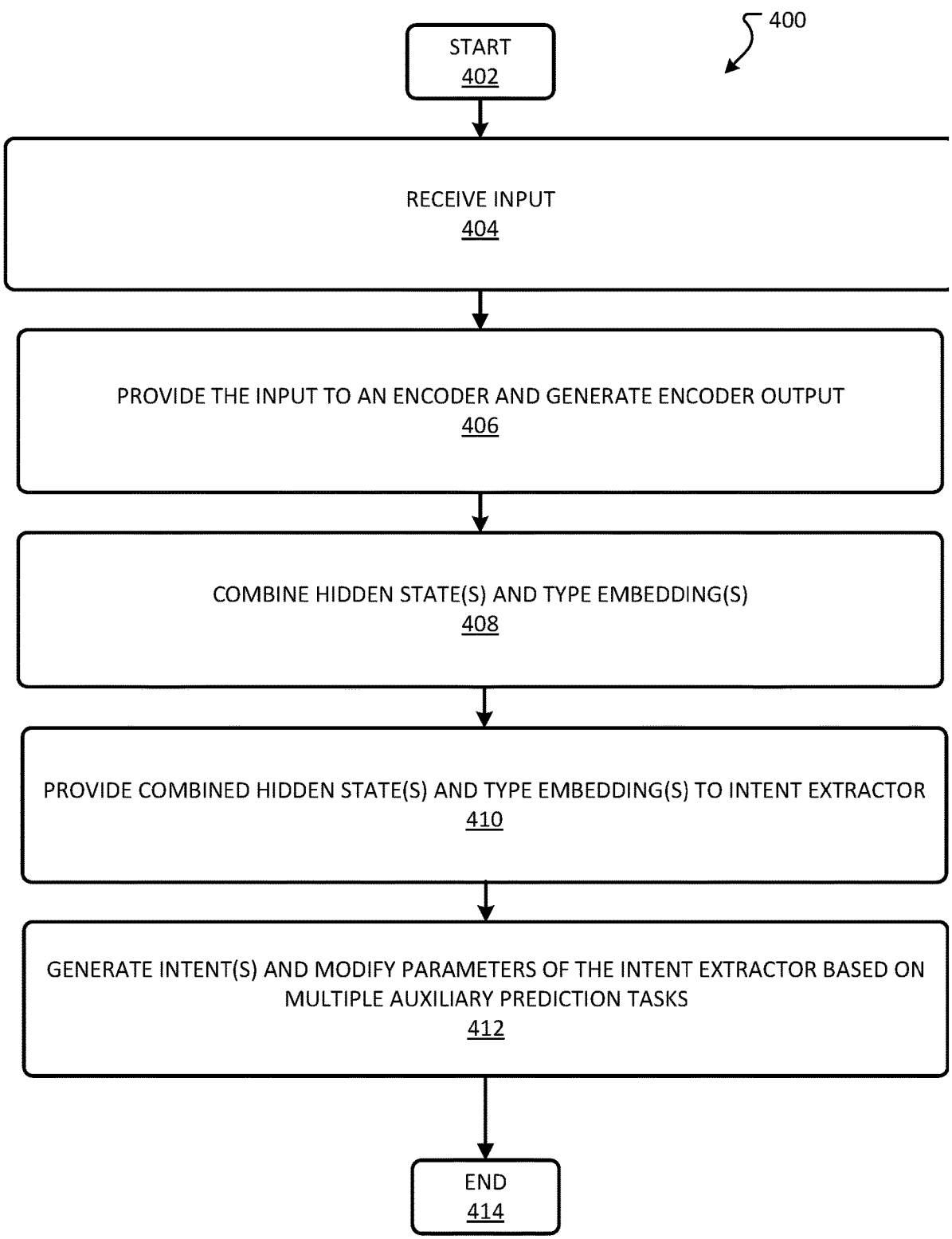
FIG. 4 depicts additional details of a method for training an intent-based task representation model in accordance with examples of the present disclosure.

Referring now to FIG. 4, additional details of the method for training an intent-based task representation model, such as the intent-based task representation model 208, are described in accordance with examples of the present disclosure. A general order for the steps of a method 400 is shown in FIG. 3. Generally, the method 400 starts at 402 and ends at 414. The method 400 may include more or fewer steps or may arrange the order of the steps differently than those shown in FIG. 4. The method 400 can be executed as a set of computer-executable instructions executed by a computer system and encoded or stored on a computer readable medium. In the illustrative aspect, the method 400 is executed by a computing device. However, it should be appreciated that aspects of the method 400 may be performed by one or more processing devices or server. Further, the method 400 can be performed by gates or circuits associated with a processor, Application Specific Integrated Circuit (ASIC), a field programmable gate array (FPGA), a system on chip (SOC), a neural processing unit, or other hardware device. Hereinafter, the method 400 shall be explained with reference to the systems, components, modules, software, data structures, user interfaces, etc. described in conjunction with FIGS. 1-3.

The method 400 starts at 402, where flow may proceed to 404. At 404, input data representative of an tasks and/or to-dos is received. For example, the input data may be the initial set of training data obtained at 304 and/or the auxiliary training data obtained at 306. The method may then proceed to 406, where task and/or to-do related information is provided to an encoder, such as the encoder 212. The encoder may be a pretrained transformer-based encoder, such as a pretrained text encoder. Alternatively, or in addition, the encoder may be a custom trained encoder that is trained specific to the data being used. The encoder may encode various types of data (e.g., date/time, location, a person a task is assigned to, importance level, etc.). In examples, the input data provided to the encoder may include data, such as a task description, and task collection information, such as a name associated with a list. In some examples, tokens may distinguish between various types of data. As an example, the input data may include a START token describing a task, and then include a token separating the task description from the task collection name. The encoder may generate various hidden states based on the input data. That is, the encoder may take the input data and encode the input data into an output. In examples, while the output of the encoder may include one or more of an average, a second last hidden state, a last hidden state, etc., the last hidden state of each is selected as the output and are then combined (e.g., concatenated) with a type embedding at 408. The type embedding may identify a token type, such as a list, to-do, task, other, etc. The last hidden states and the type associated embeddings are provided to the intent extractor at 410.

Parameters of the intent extractor can then be modified (and/or optimized) at 412 based on intent(s) generated by the intent extractor and provided to a multi-task learning framework. That is, the multi-task learning framework may utilize a plurality of auxiliary tasks that provide semantic augmentation for under-specified task texts may be utilized. For example, based on an underlying assumption that tasks with similar intents have similar target labels/texts in various auxiliary tasks, the multi-task learning framework is used to optimize the model parameters of the intent extractor such that the intent extractor performs well or is otherwise optimized over the multiple auxiliary prediction tasks. In non-limiting examples, the auxiliary prediction tasks may include an autocompletion task, a pre-action and goal generation task, and/or an action arguments prediction task. The method 400 may end at 414.

In examples, the trained intent extractor may be used, at run-time, to generate a task embedding output (e.g., to-do embedding, vector), such as the task embedding 220, based on input data (e.g., 116 for example). The task embedding output may then be provided to a downstream application for further use and/or processing. As an example, the task embedding may allow a downstream application to: (1) understand whether two tasks that have been provided (e.g., writing a document or an email) are happening or should be happening in the same space or at the same time; (2) understand prioritization; and/or (3) understand the properties of this task. For example, tasks that are more fully specified may allow downstream applications to make determinations about the task, such as but not limited to, if the task about or directed to work, school, family; or if the task belongs to a specific classification. Accordingly, the task embedding representation of the task may be a general representation of the task, and systems utilizing the task embedding can have the ability to determine, generate, or learn reason and/or reasoning for such tasks and related concepts.

Figure 5:
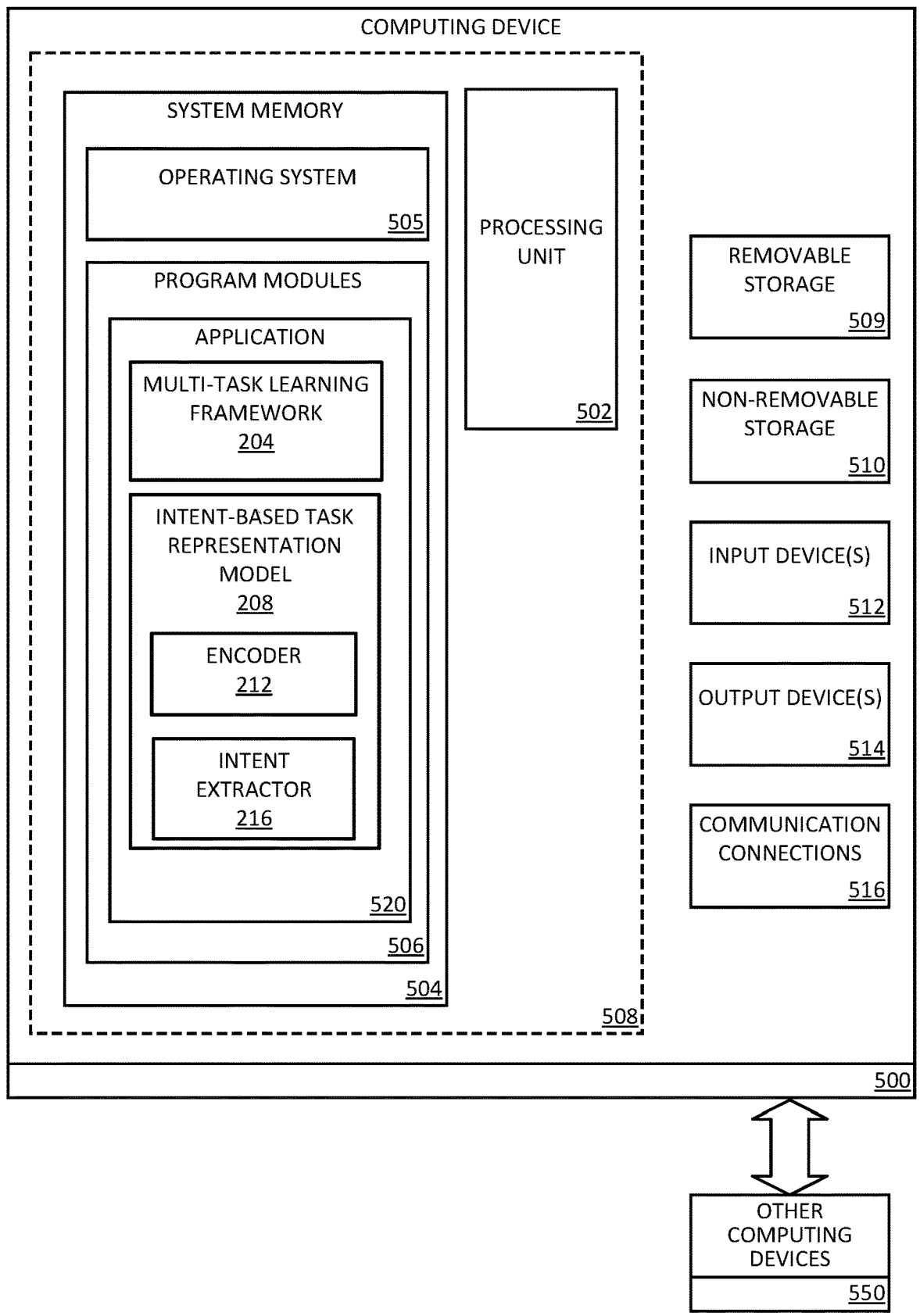
FIG. 5 is a block diagram illustrating physical components (e.g., hardware) of a computing device with which aspects of the disclosure may be practiced.

FIG. 5 is a block diagram illustrating physical components (e.g., hardware) of a computing device 500 with which aspects of the disclosure may be practiced. The computing device components described below may be suitable for the computing devices described above and/or for implementing an intent-based task representation system and/or model. For example, the computing device 500 may implement at least a portion of the intent-based task representation system 102 and/or a portion of the intent-based task representation model 103. In a basic configuration, the computing device 500 may include at least one processing unit 502 and a system memory 504. Depending on the configuration and type of computing device, the system memory 504 may comprise, but is not limited to, volatile storage (e.g., random access memory), non-volatile storage (e.g., read-only memory), flash memory, or any combination of such memories.

The system memory 504 may include an operating system 505 and one or more program modules 506 suitable for performing the various aspects disclosed herein such. The operating system 505, for example, may be suitable for controlling the operation of the computing device 500. Furthermore, aspects of the disclosure may be practiced in conjunction with a graphics library, other operating systems, or any other application program and is not limited to any particular application or system. This basic configuration is illustrated in FIG. 5 by those components within a dashed line 508. The computing device 500 may have additional features or functionality. For example, the computing device 500 may also include additional data storage devices (removable and/or non-removable) such as, for example, magnetic disks, optical disks, or tape. Such additional storage is illustrated in FIG. 5 by a removable storage device 509 and a non-removable storage device 510.

As stated above, several program modules and data files may be stored in the system memory 504. While executing on the at least one processing unit 502, the application 520 or the program modules 506 may perform processes including, but not limited to, one or more aspects, as described herein. The application 520 includes may include a multi-task learning framework 204, the intent-based task representation model 208/208T, the encoder 212, and/or the intent extractor 216, as discussed above with respect to FIGS. 2A-4 above. Other program modules that may be used in accordance with aspects of the present disclosure may include electronic mail and contacts applications, word processing applications, spreadsheet applications, database applications, slide presentation applications, drawing or computer-aided application programs, etc., and/or one or more components supported by the systems described herein.

Furthermore, aspects of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 500 on the single integrated circuit (chip). Aspects of the disclosure may also be practiced using other technologies capable of performing logical operations such as, for example, AND, OR, and NOT, including but not limited to mechanical, optical, fluidic, and quantum technologies. In addition, aspects of the disclosure may be practiced within a general-purpose computer or in any other circuits or systems.

The computing device 500 may also have one or more input device(s) 512 such as a keyboard, a mouse, a pen, a sound or voice input device, a touch or swipe input device, etc. The output device(s) 514A such as a display, speakers, a printer, etc. may also be included. An output 514B, corresponding to a virtual display may also be included. The aforementioned devices are examples and others may be used. The computing device 500 may include one or more communication connections 516 allowing communications with other computing devices 550. Examples of suitable communication connections 516 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 504, the removable storage device 509, and the non-removable storage device 510 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. Any such computer storage media may be part of the computing device 500. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 6:
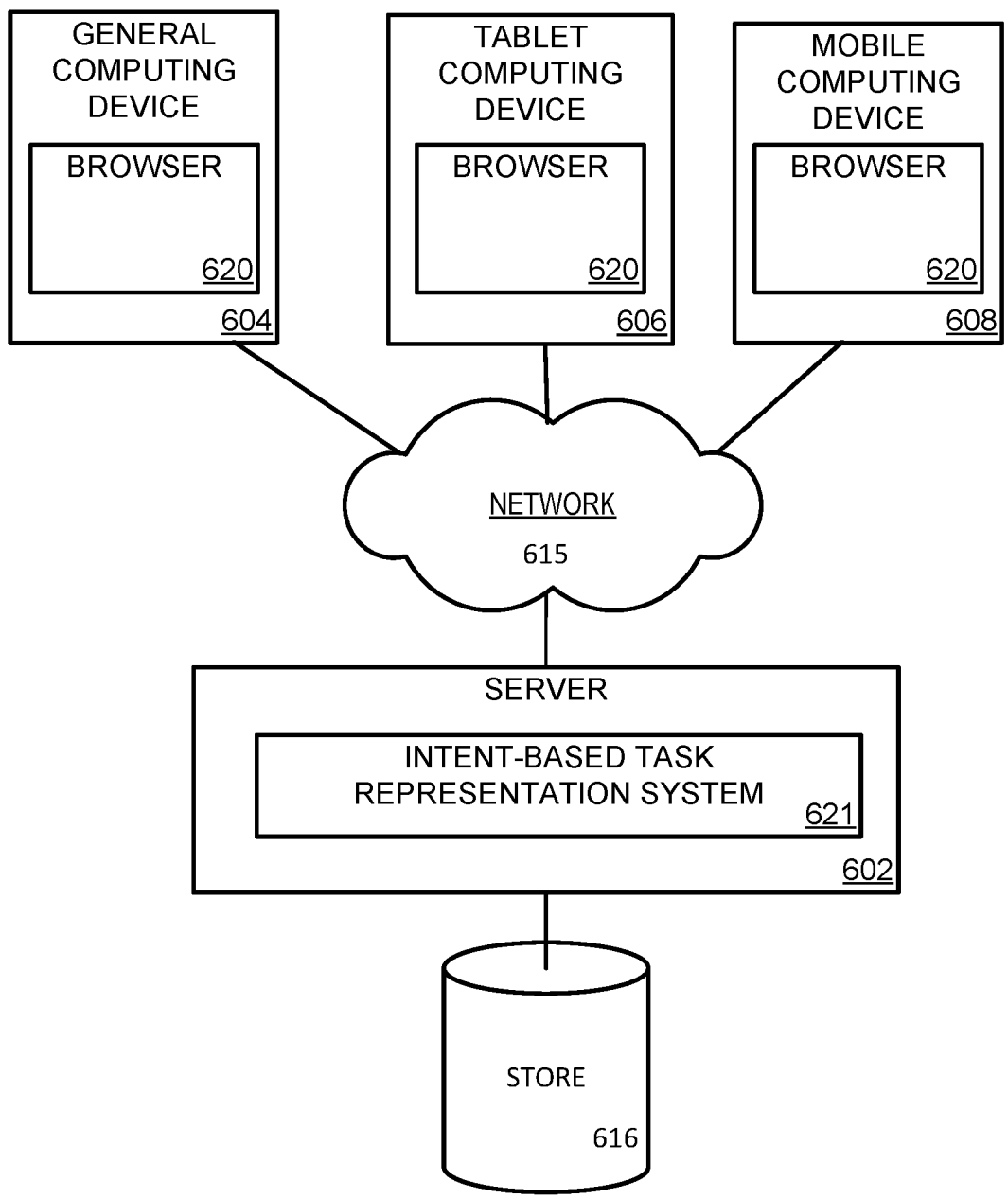
FIG. 6 depicts one aspect of an architecture of a system for processing data received at a computing system, suitable for performing various aspects disclosed herein.

FIG. 6 illustrates one aspect of the architecture of a system for processing data received at a computing system, suitable for performing the various aspects disclosed herein, from a remote source, such as a personal computer 604, tablet computing device 606, or mobile computing device 608, as described above. Content displayed at server device 602 may be stored in different communication channels or other storage types. For example, the computing devices 604, 606, 608 may represent one or more portions of the intent-based task system 100 and/or may implement one or more portions of the components described with respect to FIGS. 1-5. The server device 602 may represent one or more portions of the intent-based task system 100 and/or may implement one or more portions of the components described with respect to FIGS. 1-5.

In some aspects, the intent-based task representation system 621 may be employed by server device 602. The server device 602 may provide data to and from a client computing device such as a personal computer 604, a tablet computing device 606 and/or a mobile computing device 608 (e.g., a smart phone) through a network 612. By way of example, the computer system described above may be embodied in a personal computer 604, a tablet computing device 606 and/or a mobile computing device 608 (e.g., a smart phone). Any of these aspects of the computing devices may obtain content from the store 616, in addition to receiving task related information and/or task embeddings. The content store 616 may include ask related information and/or task embeddings, and/or model parameters as previously described.

The exemplary systems and methods of this disclosure have been described in relation to computing devices. However, to avoid unnecessarily obscuring the present disclosure, the preceding description omits several known structures and devices. This omission is not to be construed as a limitation. Specific details are set forth to provide an understanding of the present disclosure. It should, however, be appreciated that the present disclosure may be practiced in a variety of ways beyond the specific detail set forth herein.

Furthermore, while the exemplary aspects illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

While the flowcharts have been discussed and illustrated in relation to a particular sequence of events, it should be appreciated that changes, additions, and omissions to this sequence can occur without materially affecting the operation of the disclosed configurations and aspects.

Several variations and modifications of the disclosure can be used. It would be possible to provide for some features of the disclosure without providing others.

In yet another configurations, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another configuration, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another configuration, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

The disclosure is not limited to standards and protocols if described. Other similar standards and protocols not mentioned herein are in existence and are included in the present disclosure. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present disclosure.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Any of the steps, functions, and operations discussed herein can be performed continuously and automatically.

The present disclosure, in various configurations and aspects, includes components, methods, processes, systems and/or apparatus substantially as depicted and described herein, including various combinations, subcombinations, and subsets thereof. Those of skill in the art will understand how to make and use the systems and methods disclosed herein after understanding the present disclosure. The present disclosure, in various configurations and aspects, includes providing devices and processes in the absence of items not depicted and/or described herein or in various configurations or aspects hereof, including in the absence of such items as may have been used in previous devices or processes, e.g., for improving performance, achieving ease, and/or reducing cost of implementation.

The present disclosure relates to systems and methods for generating a task embedding according to at least the examples provided in the sections below:

(A1) In one aspect, some examples include a method for generating a task embedding. The method may include receiving task data representing a task; encoding at least a portion of the task data using an encoder; and generating a task embedding from an output generated by the encoder and one or more type embeddings associated with the task data, the task embedding being generated using a machine learning model trained with weak supervision and optimized over a plurality of auxiliary tasks.

(A2) In some examples of A1, the task data is underspecified and the encoder is configured to encode non-textual data about a portion of the underspecified task data.

(A3) In some examples of A1-A2 above, the method further includes combining one or more hidden states generated by the encoder with a type embedding of the one or more type embeddings associated with the task data, wherein the one or more hidden states is the output generated by the encoder.

(A4) In some examples of A1-A3 above, the non-textual data includes at least one of a due date, time, location of a user, importance level, and a person assigned to the underspecified task.

(A5) In some examples of A1-A4 above, the task embedding includes intent information indicating a predicted intent associated with the task data.

(A6) In some examples of A1-A5 above, the intent information is obtained from an intent extractor and one or more parameters of the intent extractor are modified based on a predicted output obtained from at least one task of the auxiliary tasks.

(A7) In some examples of A1-A6 above, the plurality of auxiliary tasks includes at least one of an autocompletion task, a pre-action and goal generation task, and an action arguments prediction task.

(A8) In some examples of A1-A7 above, each auxiliary task of the plurality of auxiliary tasks generates an output based on the task embedding that is different than an output of another auxiliary task of the plurality of auxiliary tasks.

In yet another aspect, some examples include a computing system including one or more processors and memory coupled to the one or more processors, the memory storing one or more instructions which when executed by the one or more processors, causes the one or more processors perform any of the methods described herein (e.g., A1-A8 described above).

In yet another aspect, some examples include a non-transitory computer-readable storage medium storing one or more programs for execution by one or more processors of a storage device, the one or more programs including instructions for performing any of the methods described herein (e.g., A1-A8 described above).

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system, comprising:
    a processor; and
    memory, including machine-readable instructions, that when executed by the processor, cause the processor to:
        receive task data representing a task;
        encode at least a portion of the task data using an encoder;
        generate a task embedding from an output generated by the encoder and a type embedding indicating a type of task associated with the task data, the task embedding including intent information indicating a predicted intent associated with the task data, wherein the task embedding is generated using a machine learning model trained on external semantically rich data sets that include contextual information describing tasks different than the task data representing the task, and the machine learning model is optimized over a plurality of auxiliary tasks; and
        provide the generated task embedding to a receiving application, the generated task embedding including additional task-related data that is different than the task data representing the task.

2. The system of claim 1, wherein the task data is underspecified and the encoder is configured to encode non-textual data about a portion of the underspecified task data.

3. The system of claim 2, wherein the machine-readable instructions, when executed by the processor, cause the processor to combine one or more hidden states generated by the encoder with the type embedding indicating the type of task associated with the task data, wherein the one or more hidden states is the output generated by the encoder.

4. The system of claim 3, wherein the non-textual data includes at least one of a due date, time, location of a user, importance level, and a person assigned to the underspecified task.

5. The system of claim 1, wherein the intent information is obtained from an intent extractor and one or more parameters of the intent extractor are modified based on a predicted output obtained from at least one task of the auxiliary tasks.

6. The system of claim 1, wherein the plurality of auxiliary tasks includes at least one of an autocompletion task, a pre-action and goal generation task, and an action arguments prediction task.

7. The system of claim 1, wherein each auxiliary task of the plurality of auxiliary tasks generates an output based on the task embedding that is different than an output of another auxiliary task of the plurality of auxiliary tasks.

8. A method for generating a task embedding, the method comprising:
    receiving task data representing a task;
    encoding at least a portion of the task data using an encoder;
    generating a task embedding from an output generated by the encoder and a type embedding indicating a type of task associated with the task data, the task embedding including intent information indicating a predicted intent associated with the task data, wherein the task embedding is generated using a machine learning model trained on external semantically rich data sets that include contextual information describing tasks different than the task data representing the task, and the machine learning model is optimized over a plurality of auxiliary tasks; and
    provide the generated task embedding to a receiving application, the generated task embedding including additional task-related data that is different than the task data representing the task.

9. The method of claim 8, wherein the task data is underspecified and the encoder is configured to encode non-textual data about a portion of the underspecified task data.

10. The method of claim 9, further comprising:
    combining one or more hidden states generated by the encoder with the type embedding associated with the task data, wherein the one or more hidden states is the output generated by the encoder.

11. The method of claim 10, wherein the non-textual data includes at least one of a due date, time, location of a user, importance level, and a person assigned to the underspecified task.

12. The method of claim 8, further comprising:
    extracting the intent information using an intent extractor; and
    modifying one or more parameters of the intent extractor based on a predicted output obtained from at least one task of the auxiliary tasks.

13. The method of claim 8, wherein the plurality of auxiliary tasks includes at least one of an autocompletion task, a pre-action and goal generation task, and an action arguments prediction task.

14. The method of claim 8, wherein each auxiliary task of the plurality of auxiliary tasks generates an output based on the task embedding that is different than an output of another auxiliary task of the plurality of auxiliary tasks.

15. A non-transitory computer-readable medium including instructions, that when executed by a processor, cause the processor to:
    receive task data representing a to-do task;
    encode at least a portion of the task data using an encoder;
    generate a task embedding from an output generated by the encoder and a type embedding indicating a type of to-do task associated with the task data, the task embedding including intent information indicating a predicted intent associated with the task data, wherein the task embedding is generated using a machine learning model trained on external semantically rich data sets that include contextual information describing tasks different than the task data representing the to-do task, and the machine learning model is optimized over a plurality of auxiliary tasks; and provide the generated task embedding to a receiving application, the generated task embedding including additional task-related data that is different than the task data representing the to-do task.

16. The computer-readable medium of claim 15, wherein the task data is underspecified and the encoder is configured to encode non-textual data about a portion of the underspecified task data.

17. The computer-readable medium of claim 16, wherein the instructions, when executed by the processor, cause the processor to combine one or more hidden states generated by the encoder with a type embedding of the one or more type embeddings associated with the task data, wherein the one or more hidden states is the output generated by the encoder.

18. The computer-readable medium of claim 17, wherein the non-textual data includes at least one of a due date, time, location of a user, importance level, and a person assigned to the underspecified task.

19. The computer-readable medium of claim 17, wherein the plurality of auxiliary tasks includes at least one of an autocompletion task, a pre-action and goal generation task, and an action arguments prediction task, and each auxiliary task of the plurality of auxiliary tasks generates an output based on the task embedding that is different than an output of another auxiliary task of the plurality of auxiliary tasks.

20. The computer-readable medium of claim 15, wherein the intent information is obtained from an intent extractor and one or more parameters of the intent extractor are modified based on a predicted output obtained from at least one task of the auxiliary tasks.

\* \* \* \* \*